(12) United States Patent
Bourdu et al.

(10) Patent No.: US 8,600,339 B2
(45) Date of Patent: Dec. 3, 2013

(54) PROACTIVE PROBE BY ECALL-ONLY IN-VEHICLE SYSTEM

(75) Inventors: Jean-Baptiste Bertrand Bourdu, South Lake Tahoe, CA (US); Nikolai Konrad Leung, Takoma Par, MD (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 13/284,013

(22) Filed: Oct. 28, 2011

(65) Prior Publication Data

US 2012/0289180 A1 Nov. 15, 2012

Related U.S. Application Data

(60) Provisional application No. 61/485,066, filed on May 11, 2011.

(51) Int. Cl.
H04W 88/02 (2009.01)

(52) U.S. Cl.
USPC ...................................... 455/404.1

(58) Field of Classification Search
USPC ...................................... 455/404.1
See application file for complete search history.

(56) References Cited

U.S. PATENT DOCUMENTS

| | | | |
|---|---|---|---|
| 7,333,795 B2 | 2/2008 | Dorsey et al. | |
| 8,180,316 B2 * | 5/2012 | Hwang | 455/404.1 |
| 2004/0203745 A1 | 10/2004 | Cooper | |
| 2005/0037753 A1 | 2/2005 | Andersen et al. | |
| 2008/0147410 A1 * | 6/2008 | Odinak | 704/270.1 |
| 2009/0253403 A1 | 10/2009 | Edge et al. | |
| 2012/0149341 A1 * | 6/2012 | Tadayon et al. | 455/412.1 |
| 2012/0203557 A1 * | 8/2012 | Odinak | 704/270.1 |
| 2012/0214472 A1 * | 8/2012 | Tadayon et al. | 455/418 |

FOREIGN PATENT DOCUMENTS

| | | |
|---|---|---|
| EP | 2282586 A1 | 2/2011 |
| KR | 20050075573 | 7/2005 |

OTHER PUBLICATIONS

Options for eCall MSD signalling, GSM Europe. Eirini Zafeiratou, Director GSME. Apr. 21, 2006, pp. 1-22.
International Search Report and Written Opinion—PCT/US2012/029674—ISA/EPO—Jun. 20, 2012.

* cited by examiner

*Primary Examiner* — Diane Mizrahi
(74) *Attorney, Agent, or Firm* — Austin Rapp & Hardman

(57) ABSTRACT

Proactive registration probes are conducted by an eCall-only IVS prior to an emergency to determine network availability and which available roaming networks a registration request will be approved by the home network. The results of this probing are stored and managed by the IVS. If no suitable roaming network can be found (or if only limited service is available, and this limited service cannot support an eCall), the IVS may notify the driver that the emergency call service may not be available. The frequency of the probing may be increased or decreased based on a variety of factors, including whether the IVS is currently receiving home network service, roaming network service, or no service, as well as whether the vehicle is moving and whether probing has previously been completed for a particular area (using location information, for example).

44 Claims, 6 Drawing Sheets

PROACTIVE PROBE BY ECALL-ONLY IN-VEHICLE SYSTEM

CLAIM OF PRIORITY UNDER 35 U.S.C. §119

The present Application for Patent claims priority to Provisional Application No. 61/485,066, filed on May 11, 2011, and assigned to the assignee hereof and hereby expressly incorporated by reference herein.

BACKGROUND eCall refers to an in-vehicle emergency call service. In the event of a collision involving the vehicle, the eCall In-Vehicle System (IVS) establishes an emergency call via a mobile network to emergency agencies. The IVS can be provisioned for "eCall-only" service or for "mixed-mode eCall" service. In mixed-mode eCall service, the system can be used to perform emergency eCalls as well as non-emergency, subscription-based calls. In eCall-only mode, however, the system can only be activated to make emergency calls, and an IVS in eCall-only mode does not register on the mobile network before the eCall is triggered. Thus, when an eCall emergency is triggered, two operations must be performed: (1) the IVS must first register on an available mobile network, and then (2) the IVS initiates the eCall emergency call. Conventionally, registration of the IVS on the mobile network to place an eCall is performed similar to registration for non-emergency calls.

When the IVS is "roaming" and its Home Public Land Mobile Network (HPLMN) or "home network" is unavailable, the IVS must register on a Visitor Public Land Mobile Network (VPLMNs) or "roaming network" if one is available. It may be the case that no network is available or that an available network can only provide limited service, in which case eCall may be inoperable—for example, where the IVS itself cannot initiate eCall from limited service areas, or the roaming network cannot accept an emergency call in a limited service area (as may be the case in certain European countries). Moreover, even when a roaming network is available, it must receive permission from the IVS's home network before the roaming network can register the IVS. It is not uncommon for such permission to be denied, especially in typical instances where the home network has a roaming registration management policy (RRMP) that only permits registrations (and subsequent call servicing) by preferred VPLMN partners ("preferred partners") with whom the home network has established favorable business arrangements. Thus, in operation, the home network might automatically reject registrations from non-preferred roaming networks unless and until it receives and accepts a registration request through one of its preferred partners.

Whereas a typical mobile phone user might become aware of these issues (no service, limited-but-unusable service, etc.) when the mobile phone is powered on or roams into a visited network (e.g., the mobile phone may provide a "no service" message or signal to the user) or the first time a user attempts to place a call and thus may be able to take steps to correct the situation, an eCall-only subscriber will be entirely unaware of these issues because the eCall-only IVS attempts to connect to a network only after an emergency has arisen and time is of the essence. In other words, to make an emergency call while roaming, an eCall-only IVS not only has to find service (and risk that no service is available) but may also have to attempt registering with several available roaming networks before one is finally accepted by the IVS's home network (if at all), and this may take several minutes to succeed (if ever). Thus, network availability and conventional roaming registration of the IVS on the mobile network may significantly delay the placing of the emergency call—a call that is critically important to successfully register as quickly as possible.

SUMMARY

Several implementations disclosed herein are directed to proactive registration probes conducted by an eCall-only IVS to determine (a) network availability and (b) which available roaming networks a registration request will be approved by the home network. For various such implementations, the results of this probing are stored and managed by the IVS for future use. Conversely, if no suitable roaming network can be found, or if only limited service is available, the IVS may notify the driver that the emergency call service may not be available.

In some implementations, the frequency of the probing could be increased or decreased based on a variety of factors, including whether the IVS is currently receiving home network service, roaming network service, or no service, as well as whether the vehicle is moving and, using location information, whether probing has already been completed for a particular area.

In some implementations, information pertaining to accepted and rejected networks might expire after an appropriate period of time or after certain events in order to reduce the risk of having information rendered inaccurate by changes over time.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

To facilitate an understanding of and for the purpose of illustrating the present disclosure and various implementations, exemplary features and implementations are disclosed in, and are better understood when read in conjunction with, the accompanying drawings—it being understood, however, that the present disclosure is not limited to the specific methods, precise arrangements, and instrumentalities disclosed. Similar reference characters denote similar elements throughout the several views. In the drawings.

DETAILED DESCRIPTION

"112" is the principal emergency telephone number that can be dialed free of charge from any telephone or any mobile phone in the European Union (EU) in order to reach emergency services such as ambulance, firefighter, and police services. The GSM mobile phone standard also designates 112 as an emergency number so it will work on GSM phones everywhere including North America (where GSM systems redirect emergency calls to 911, the U.S. equivalent of 112) and Australia (where emergency calls are redirected to 000, the Australian equivalent of 112). "E112" is a location-enhanced version of 112 specifically designed for mobile phones where the location information for the caller is determined and transmitted to the emergency center (similar to the Enhanced 911 or "e911" system in the U.S.).

"eCall" refers to an interoperable in-vehicle emergency call service built on the E112 system operated in Europe. The purpose of eCall is to speed up emergency service response times to road accidents. In the event of a collision, accident, or emergency condition, eCall is used to automatically or manually establish an emergency voice call via the cellular network to the local emergency agencies, i.e., a Public-Safety Answering Point (PSAP). In addition to enabling two-way speech communication between the motorist and a PSAP operator, eCall also allows transfer of a data message from the In-Vehicle System (IVS) over the cellular network to the PSAP which is denoted an eCall Minimum Set of Data (MSD) which includes vehicle location information, a time stamp, the number of passengers (e.g., number of fastened seatbelts if detectable), the Vehicle Identification Number (VIN), and other relevant information. Additional data may also indicate how the eCall was initiated, a location estimate confidence rating, the direction of travel (if available), a trigger type (e.g., deployed airbags, bumper sensors, etc.), and so forth.

Figure 1:
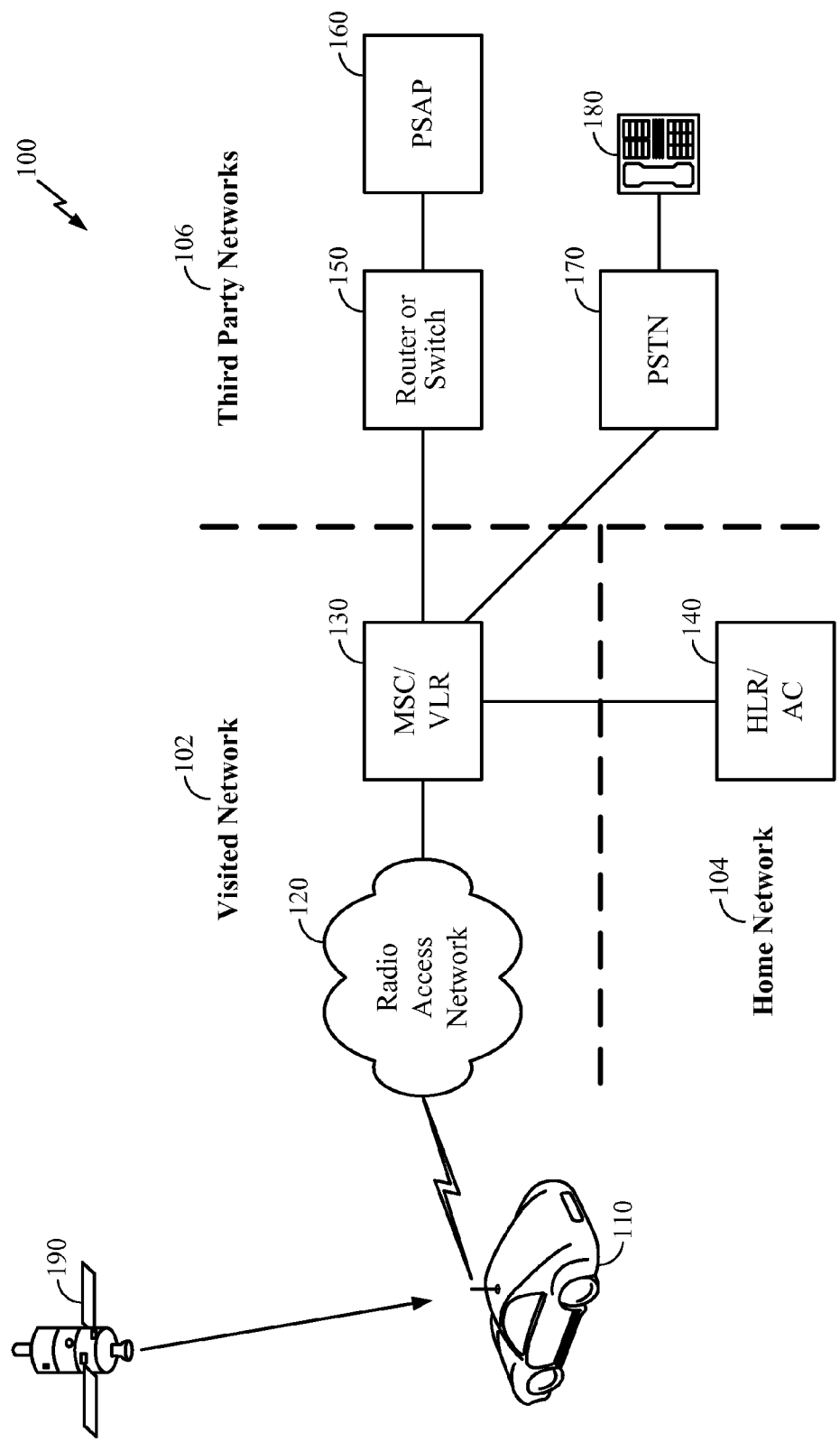
FIG. 1 is an illustration of an exemplary mobile communications network featuring an eCall emergency calling service.

FIG. 1 is an illustration of an exemplary mobile communications network 100 featuring an eCall emergency calling service. The mobile communications network 100 may include a roaming network 102 (also referred to as a visited network), a home network 104, and third party networks 106. The roaming network 102 may also be referred to as a Visited Public Land Mobile Network (VPLMN), a serving network, etc. Home network 104 may also be referred to as a Home Public Land Mobile Network (HPLMN). The roaming network 102 may be a serving network for an IVS 110 which may be roaming from its home network 104, as assumed in much of the description below. (In effect, the roaming network 102 and home network 104 may be the same network if the IVS 110 is not roaming.)

The roaming network 102 may include one or more base stations at the radio access network (RAN) 120, a Mobile Switching Center (MSC)/Visitor Location Register (VLR) 130, and other network entities not shown in FIG. 1 for simplicity. RAN 120 may be a Global System for Mobile Communications (GSM) network, a Wideband Code Division Multiple Access (WCDMA) network, a General Packet Radio Service (GPRS) access network, a Long Term Evolution (LTE) network, CDMA 1X network, a High Rate Packet Data (HRPD) network, an Ultra Mobile Broadband (UMB) network, etc. GSM, WCDMA, GPRS and LTE are part of Universal Mobile Telecommunication System (UMTS) and are described in documents from an organization named "3rd Generation Partnership Project" (3GPP). CDMA 1X and HRPD are part of cdma2000, and cdma2000 and UMB are described in documents from an organization named "3rd Generation Partnership Project 2" (3GPP2). MSC 130 may perform switching functions for circuit-switched calls and may also route Short Message Service (SMS) messages. VLR 130 may store registration information for terminals that have registered with roaming network 102.

Home network 104 may include a Home Location Register (HLR)/Authentication Center (AC) 140 and other network entities not shown in FIG. 1 for simplicity. HLR 140 may store subscription information for terminals (including IVS 110) that have service subscription with home network 104. AC 140 may perform authentication for terminals (including IVS 110) having service subscription with home network 104.

Third party networks 106 may include a router or switch 150 (e.g., a PSAP selected router), a PSAP 160, a Public Switched Telephone Network (PSTN) 170, and possibly other network entities not shown in FIG. 1. Router or switch 150 may route calls between MSC 130 and PSAP 160. PSAP 160 may be responsible for answering emergency calls and may also be referred to as an Emergency Center (EC). PSAP 160 may be operated or owned by a government agency, e.g., a county or city. PSTN 170 may also provide telephone services for conventional wireline telephones, such as a telephone 180. Of course, FIG. 1 shows only some of the network entities that may be present in the roaming network 102 and the home network 104. For example, roaming network 102 may include network entities supporting packet-switched calls and other services, as well a location server to assist in obtaining terminal (i.e., IVS 110) location.

Generally an IVS 110 is a dedicated In-Vehicle System (IVS) that may be permanently attached to or made part of a vehicle. The IVS 110, as a wireless communications terminal, may be also be thought of (and variously referred to as) a mobile station (MS) in GSM and CDMA 1X, a user equipment (UE) in WCDMA and LTE, an access terminal (AT) in HRPD, a SUPL enabled terminal (SET) in Secure User Plane Location (SUPL), a subscriber unit, a station, and so forth. The IVS 110 may also comprise or communicate with a personal navigation device (PND), and satellite signal reception, assistance data reception, and/or position-related processing may occurs at the IVS 110 or, alternately, at the PND. The IVS 110 may have a service subscription with home network 104 and may be roaming in roaming network 102, as shown in FIG. 1.

When activated, the IVS 110 may receive signals from RAN 120 in roaming network 102 and communicate with the RAN 120 to obtain communication services. The IVS 110 may also communicate with home network 104 for communication services when not roaming, although not shown in FIG. 1. The IVS 110 may also receive, via its PND (if present), signals from one or more satellites 190 which may be part of a satellite positioning system (SPS). As used herein an SPS may include any combination of one or more global and/or regional navigation satellite systems and/or augmentation systems, and SPS signals may include SPS, SPS-like, and/or other signals associated with such one or more SPS.

The IVS 110 may measure signals from satellites 190 and obtain pseudo-range measurements for the satellites. The IVS 110 may also measure signals from base stations in RAN 120 and obtain timing and/or signal strength measurements for the base stations. The pseudo-range measurements, timing measurements and/or signal strength measurements may be used to derive a position estimate and location information for the IVS 110.

Figure 2:
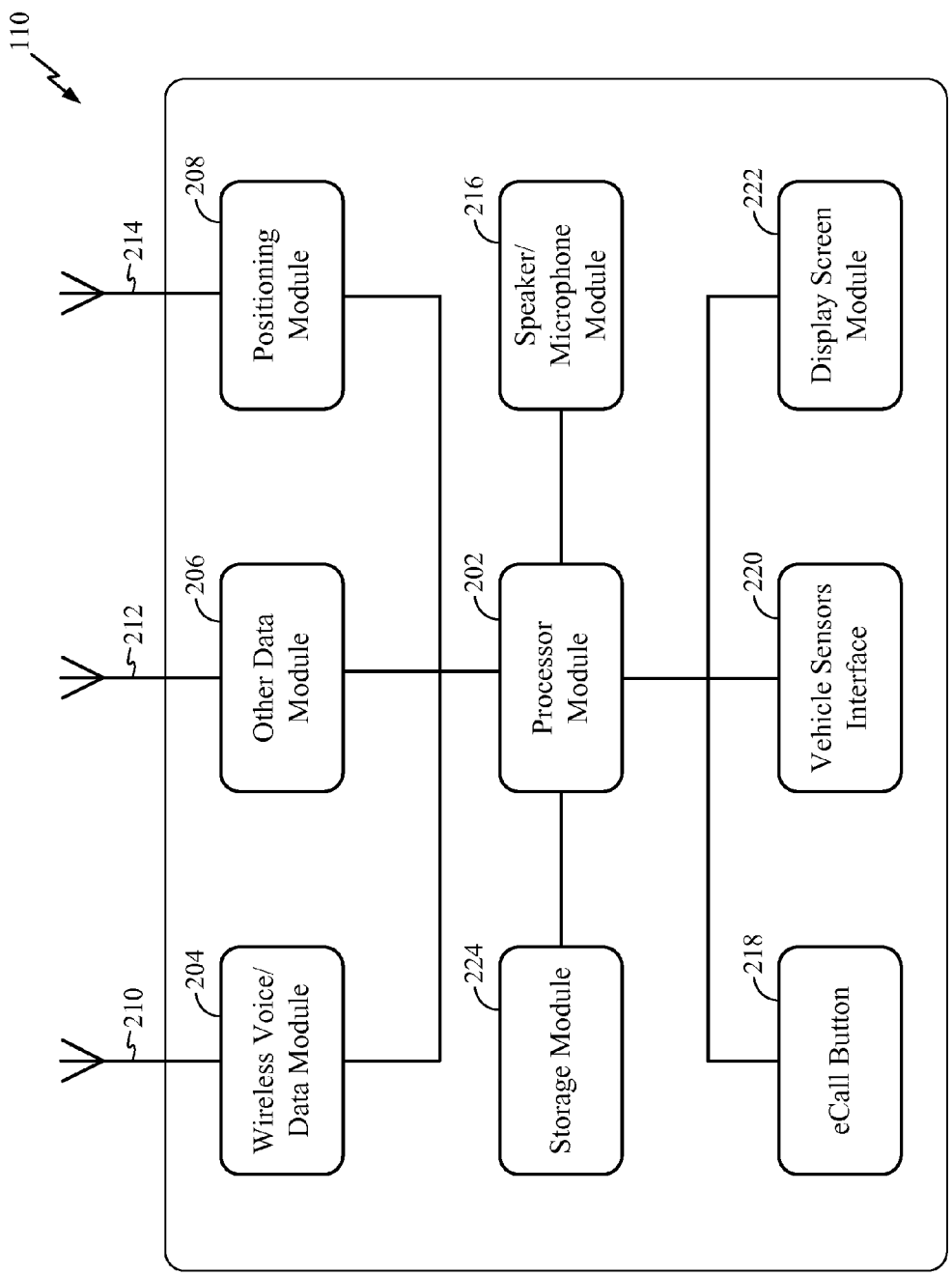
FIG. 2 is a block diagram of an exemplary In-Vehicle System (IVS) wireless device or apparatus that may be provisioned to operate as an eCall-only capable device illustrative of various implementations disclosed herein.

FIG. 2 is a block diagram of an exemplary IVS 110 wireless device or apparatus that may be provisioned to operate as an eCall-only capable device illustrative of various implementations disclosed herein. The IVS 110 may include a processor module 202 coupled to a plurality of wireless modules that enable the IVS 110 to communicate wirelessly. For example, the wireless modules may include a wireless voice/data module 204, an other data module 206 (e.g., Bluetooth module), and a positioning module 208 (e.g., GPS module), although the IVS 110 is not limited to the illustrated wireless modules. Each of the illustrated wireless modules is coupled to an antenna 210, 212 and 214, respectively. Although the antennas 210, 212 and 214 are shown as separate antennas, a single unitary antenna may also be used and coupled to the modules 204-208.

The processor module 202 may also be coupled to a speaker/microphone module 216, an eCall button 218, a vehicle sensors interface 220 and a display screen module 222. Furthermore, the processor module 202 may be coupled to a storage module 224 that may include information that provisions the IVS 110 as an eCall-only capable device. The eCall button 218 may be used to manually initiate an emergency call in the event of an accident or other situation requiring attention or assistance from emergency services. The vehicle sensors interface 220 may be coupled to sensors (not illustrated) deployed in a vehicle and designed to detect an accident condition that may require attention or assistance from emergency services. Such vehicle sensors may be attached to an airbag deployment mechanism, vehicle body integrity sensors, or the like.

The IVS 110 may be configured to transmit and receive voice and data communications to and from the MSC 130 via the RAN 120 during emergency calls (following registration). The MSC 130 enables emergency information from the IVS 110 to be communicated to the PSAP 160 via the RAN 120 or the PSTN 170. Such emergency information may be communicated to the PSAP 160 once the IVS initiates an emergency call using the appropriate emergency number (e.g., 112, 911, 000, etc.) stored in the device. The emergency information may include voice communications directly from a user and via the speaker/microphone module 216, data generated from sensors coupled to the vehicle sensors interface 220, and positioning information from the positioning module 208.

As mentioned earlier, the IVS 110 may be provisioned as an eCall-only device, and such provisioning information may be stored in the storage module 224. The storage module 224 may be a nonvolatile storage, volatile storage, a Subscriber Identity Module (SIM), a Universal Subscriber Identity Module (USIM), or any other suitable storage capable element.

The speaker/microphone module 216 may be used during voice calls between the IVS 110 and the PSAP 160. Telematics application specific buttons, such as the eCall button 218, may be used to activate the eCall-only IVS or otherwise initiate the generation and transmittal of specific emergency data messages and/or emergency voice communications to the PSAP 160 via the eCall system. Furthermore, initiation of data communication may also be accomplished automatically via vehicle sensors, such as sensors coupled to the airbag deployment mechanism.

Each of the wireless modules 204-208 includes a transmitter to transmit and encode voice and data messages using antennas 210-214, respectively, via an over-the-air protocol such as CDMA, WCDMA, GSM, TDMA, or the like. The wireless modules 204-208 may also be configured to transmit by other wireless communications, such as satellite communications. Each of the wireless modules 204-208 also includes a receiver to receive and decode voice and data messages from the cell site, the MSC 130 and the PSAP 160, or any other component associated with the communications network 100. Such received voice and data messages may be received via an over-the-air protocol such as CDMA, WCDMA, GSM, TDMA, or the like. The wireless modules 204-208 may also be configured to receive other wireless communications, such as satellite communications. The transmitters and receivers may be integrated transceiver devices. These elements are discussed in more detail with respect to FIG. 6.

Dedicated eCall IVSs, known as "eCall-only" IVSs, are those IVSs associated with a vehicle and designed for the sole purpose of making emergency calls such as in the event of an accident. Such IVSs are generally said to operate in an "eCall-only mode." Generally, an eCall-only IVS differs from other eCall IVSs and conventional mobile communications devices (with or without eCall capabilities) in that the eCall-only IVS does not perform mobility management procedures (MMPs)—such as registration on a Public Land Mobile Network (PLMN)—except when the IVS is attempting to initiate an emergency call (or, in some instances, when the IVS is attempting to initiate a test or reconfiguration connection upon request of the user). Also, after registering and placing an emergency call, the eCall-only device may then be permitted to perform MMPs in order to allow call-back by the PSAP as well as normal voice and data communication functionality, SMS messaging, or other such wireless device capabilities for the duration of the emergency (or a suitably estimated period of time). Up until the moment an accident actually occurs, however, the eCall-only IVS is maintained in an inactivate state.

In the event of an accident, an in-vehicle sensor may be triggered that activates the eCall-only IVS. Since this IVS was inactive prior to the accident, it is first necessary for the IVS to effect a connection (i.e., register) with an available network before it can transmit any data regarding the accident. Ideally this connection is made to the home network (HPLMN), but when the IVS is "roaming" (i.e., when the IVS's home network is unavailable or unreachable) the IVS must register on a roaming network (VPLMN) if one is available.

Figure 3:
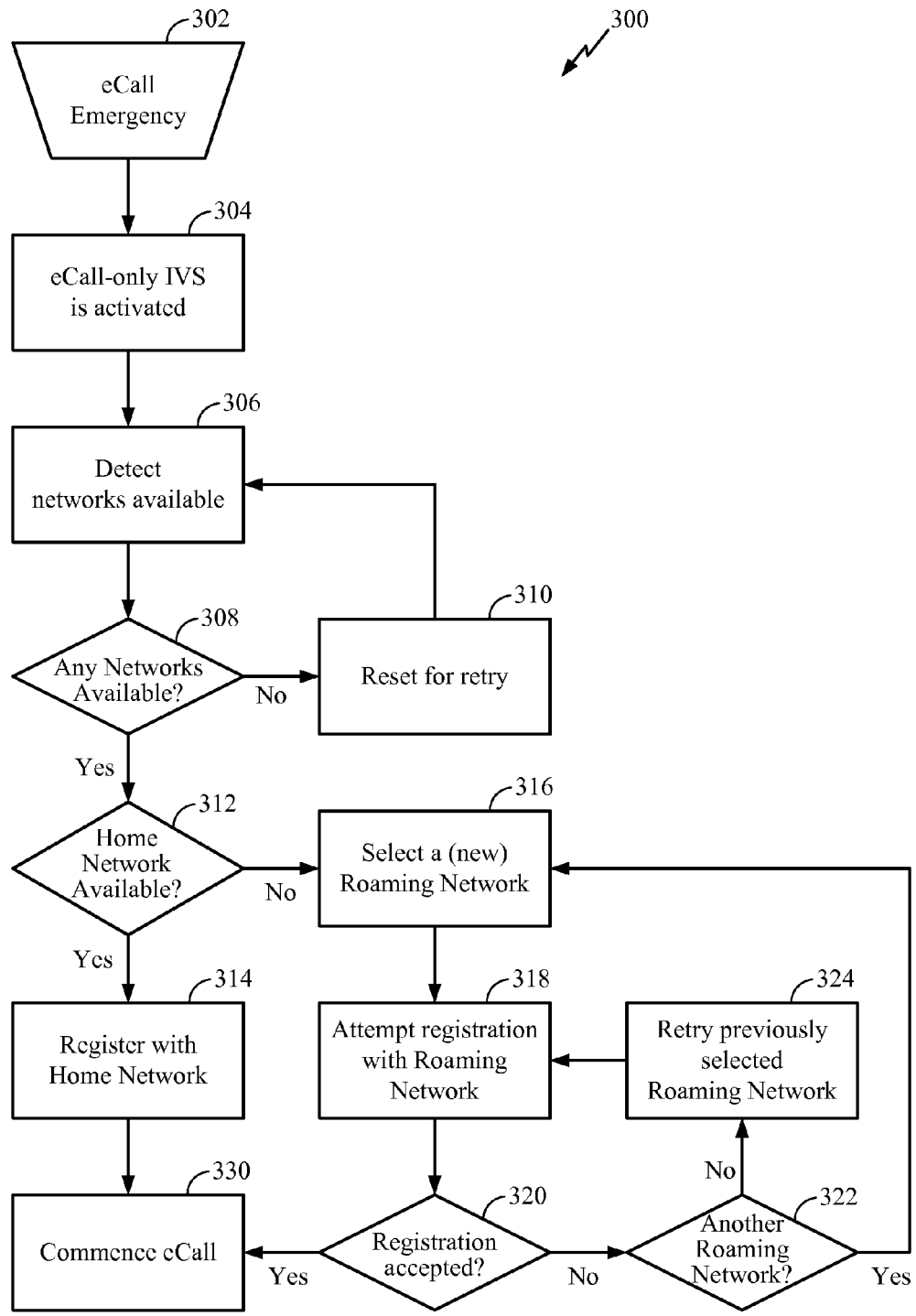
FIG. 3 is an operational flow diagram representative of a method for an eCall-only IVS to register and place an emergency call.

FIG. 3 is an operational flow diagram representative of a method 300 for an eCall-only IVS to register and place an emergency call. At 302, an eCall emergency call—for example, the deployment of the airbag in an accident or the press of an eCall button by the driver experiencing a medical emergency—activates, at 304, the eCall-only IVS. At 306, the IVS detects if any networks are available, and if no networks are available as determined at 308, then at 310 the IVS resets and retries to detect at 306 again if any networks are available—and continues to do so until an available network is detected (if ever).

When at least one network is available and detected at 308, and if at 310 one of these available networks is the home network, then at 314 the IVS registers with the home network (which should only require one registration request) and then immediately commences the eCall at 330. However, if the home network is not available at 312, then at 316 the IVS must select a roaming network from among the networks detected and, at 318, attempts to register with the roaming network. If the registration is accepted by the roaming network—which, as discussed later herein, is largely dependent on whether the roaming network is permitted to accept the registration by the IVS's home network—then the IVS can commence the eCall at 330. However, if the registration is rejected at 320, then if another roaming network is available at 322 the IVS can return to 316 and select this new roaming network and attempt to register with this new network at 318. However, if there is no other roaming network to select—such as when the IVS only detects one roaming network at 306—then at 324 the IVS retries to connect with the same roaming network with a new attempt at 318. The IVS may continue to attempt registration attempts with the available networks until the registration is successfully accepted by an available network.

With regard to 320, and before an available roaming network can register the IVS, the roaming network must first receive permission from the IVS's home network. There are several reasons for having to obtain this permission, not least among them being the common practice that requires the home network to pay the roaming network for registering and servicing the roaming call(s). Thus, it may be prudent for the home network to prefer certain networks over others and deny such permission to certain such roaming networks. To accomplish this, the home network may utilize a roaming registration management policy (RRMP) that only permits registrations (and subsequent call servicing) by the home network's preferred VPLMN partners ("preferred partners").

A home network's preferred partners might be those roaming networks with whom the home network has established favorable business arrangements for servicing roaming calls or, alternately, may include roaming networks known to have favorable pricing for servicing the home networks roaming calls. Thus, the home network may be well-incentivized to automatically reject registrations from non-preferred roaming networks and only accept registration requests through one of its preferred partners, effectively leaving its roaming subscribers (and their mobile communication devices, including IVSs) with the challenge of cycling through each of the available roaming networks until it finds one acceptable to the home network (if ever).

Consequently, to make an emergency call while roaming, the eCall-only IVS must first find the available networks and then attempt to register with each one successively until one is found that is accepted by the IVS's home network (if any). These tasks occur after the accident that triggered the eCall, and the necessary steps to place the eCall may take anywhere from several minutes (to find an acceptable network) to infinitely long (when no preferred network is found). For this reason, network unavailability and/or conventional roaming registration of the IVS on the mobile network may significantly delay or completely prevent the placing of an emergency call, and this may significantly impair the provision of timely emergency care for accident victims.

To provide better provision of emergency services through an eCall-only IVS, several implementations disclosed herein are directed to proactive registration probes conducted by an eCall-only IVS prior to an emergency to determine (a) network availability and (b) which available roaming networks a registration request will be approved by the home network. For several such implementations, the results of this probing are then stored and managed by the IVS for future use. Conversely, if no suitable roaming network can be found (or if only limited service is available, and this limited service cannot support an eCall), the IVS may notify the driver that the emergency call service may not be available. In addition, for certain implementations the frequency of the probing could be increased or decreased based on a variety of factors, including whether the IVS is currently receiving home network service, roaming network service, or no service, as well as whether the vehicle is moving and whether probing has previously been completed for a particular area (using location information, for example). Similarly, information pertaining to accepted and rejected networks might expire after an appropriate period of time (which may be predetermined or calculated) or after certain event (such as a user selection or system reset) in order to reduce the risk of having information rendered inaccurate by changes over time.

Figure 4:
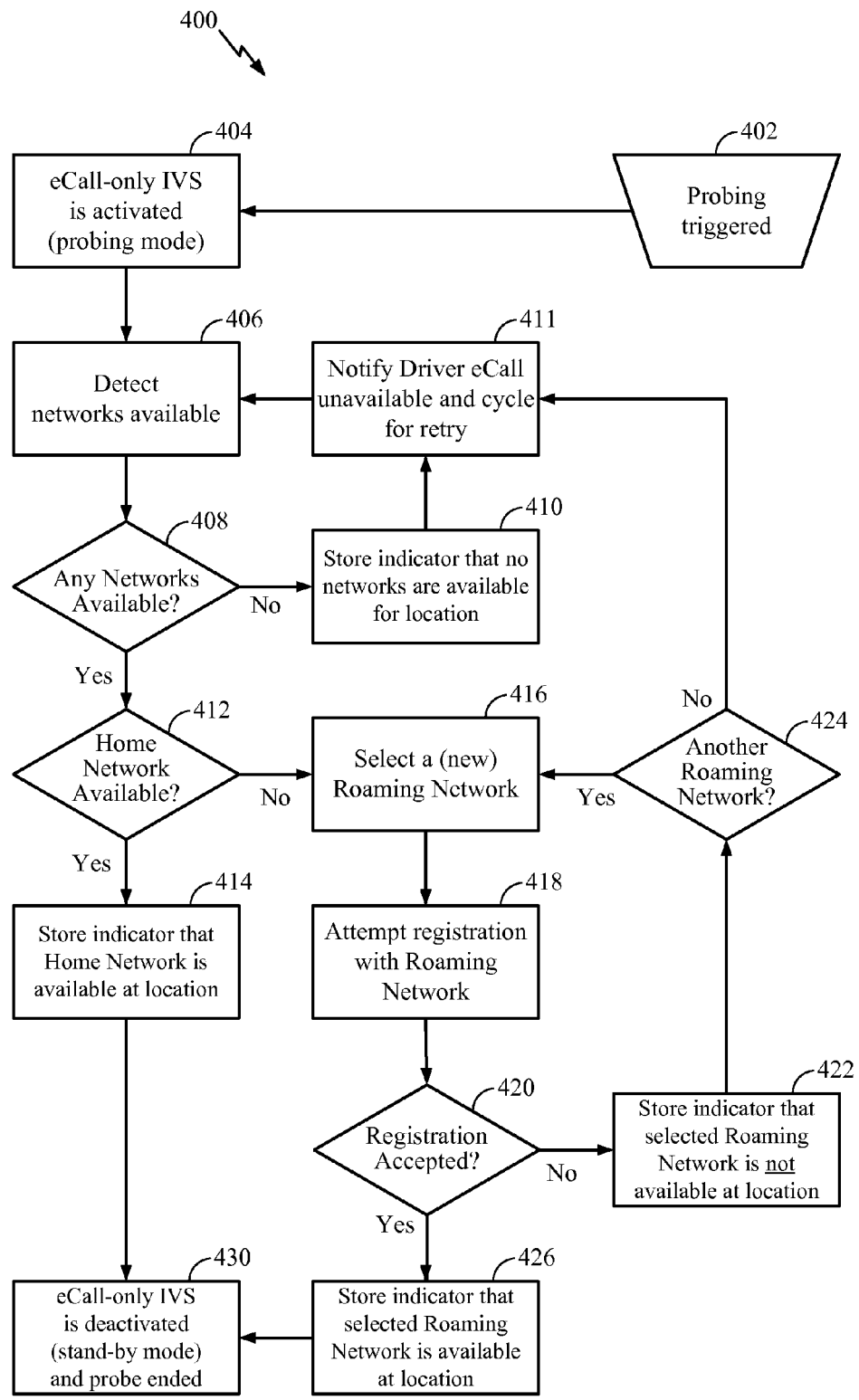
FIG. 4 is a process flow diagram of a method, representative of several implementations disclosed herein, for proactively probing for an available network on which an eCall-only IVS can successfully register and complete an eCall emergency call.

FIG. 4 is a process flow diagram of a method 400, representative of several implementations disclosed herein, for proactively probing for an available network on which an eCall-only IVS can successfully register and complete an eCall emergency call. At 402, a proactive probing cycle is triggered by, for example, the IVS finding itself in a new location (based on, e.g., GPS information, cell tower triangulation, or other location detection methodologies such as those discussed elsewhere herein), by expiration of an intercycle clock, or by user request (i.e., the driver manually pushing an "update" button, for example), among other possible triggers. The probing trigger at 402 then causes, at 404, the eCall-only IVS to activate. In certain implementations, the triggering may occur separate from the eCall-only IVS device, in which case the entire device may be inactive until triggered. In other implementations, however, where the IVS includes additional functionality such as the disclosed proactive probing functionality, for example, then only the mobile communication functionality (i.e., mobility management features) may be active or inactive, and thus such activating the eCall-only IVS would comprise activating the mobile communications functionality. Moreover, at 404 the eCall-only IVS may specifically activate in a "probing mode" as opposed to being activated during an eCall emergency as illustrated in FIG. 3, for example.

After the eCall-only IVS is activated at 404 (that is, when the normally dormant/inactive mobile communications functionality is activated), at 406 the IVS detects if any networks are available, and if no networks are available as determined at 408, then at 410 certain implementations of the IVS will store an indicator that no networks are available for that particular location. For example, an indicator may comprise the network identification, the location, the date/time (timestamp) of the probe, and an indication of availability. For some embodiments, this indication of availability may further comprise specific information about the availability such as, for example, where the network could provide no services or only limited service unsuitable for eCall services (both rendering the network unavailable), or an indication as to signal strength. Additional or alternative information may also be included in the indicator stored by the IVS system for future reference. Then, for certain implementations, at 411 the driver might be notified that eCall services are unavailable (enabling the driver to take proactive actions such as, for example, moving the vehicle to a location where eCall services are available and/or take manual measures to better ensure the safety of the vehicles occupants) and, since no eCall services are available, the IVS might also automatically cycle and retry again to detect networks at 406. The "cycle" here mentioned may be, for different implementations, an immediate re-attempt, a delayed re-attempt after a suitable period of time (second, minutes, etc.), or a delayed re-attempt after a change in location of the vehicle/IVS, or a combination of such, or based on different factors altogether. However, for such implementations represented by the illustration of FIG. 4, the probe might not be deemed complete unless and until an available and registerable network is identified by the IVS for the probe.

On the other hand, if there are networks available at 408, and if one of these networks is the home network at 412, then at 414 the IVS stores an indicator of some kind (described above) that the home network is available at that location and, at 430, the eCall-only IVS is deactivated (or, at a minimum, the mobile communications functionality of the IVS is placed in an inactive state). If the home network is not available at 412, however, then at 416 the IVS selects a roaming network to probe and, at 418, the IVS attempts to register with the roaming network (albeit with no intent to actually complete the registration even if permitted, or to at least immediately detach from the network once the registration is permitted or prevented). If the registration is accepted at 420, then at 426 the IVS stores an indicator that the selected roaming network is available at that location and, at 430, the eCall-only IVS is deactivated (or, at a minimum, the mobile communications functionality of the IVS is placed in an inactive state) without completing the registration (e.g., detaching from the network) or otherwise utilizing the roaming network for any wireless communication services.

If the registration request made at 418 is not accepted at 420 then, at 422, the IVS stores an indicator that the selected roaming network is not available at that location (or more specifically, for certain implementations, that the selected roaming network cannot register the IVS). Then, if there is another roaming network available at 424, the IVS selects a new roaming network at 416 and again attempts to register but this time with the new roaming network. As illustrated in FIG. 4, this process continues until a roaming network is found that will accept the IVS's registration request or, at 424, there are no more roaming networks left to try (and none found to service an eCall from the IVS), and thus at 411 the driver is again notified that eCall services are unavailable and the IVS cycles for a retry (to return to 406) as previously described.

It should be noted that, as illustrated in the method 400 of FIG. 4, the IVS may only probe until a suitable network is found (i.e., the home network or a roaming network on which the IVS can successfully register if necessary), and thus stores indicators only for the one network the IVS can connect to—be that the home network or a roaming network that was tried (registration request) and succeeded—along with those available roaming networks that are tried but failed to register the IVS (if any). In alternative implementations, the IVS may attempt to probe every available network it finds, and store an indicator for each such network. For some such alternative implementations, the IVS may attempt to probe every available roaming network only if it is unable to connect to the home network. And in yet other implementations, the IVS may attempt to probe one or more networks (home or roaming) more than once and, for some such implementations, store with the corresponding indicator the number of attempts made before a successful registration was returned. Moreover, combinations of these variable probing implementations may be used in different circumstances; for example, a quick probe to find one available and useable network (home network or roaming network) may be most suitable when the vehicle is in motion (and may not remain in the location for very long), whereas a more comprehensive probing may be used when the vehicle remains in a location for a longer duration or repeatedly visits the same location. Regarding the latter, then, a complete probing may be undertaken in several steps separated in time and may comprise smaller probes similar to the one illustrated in FIG. 4.

The indicators stored by the IVS are only relevant for the location where the probing occurs, and only for a suitable duration of time. Consequently, the indicators may be purged and updated accordingly to help prevent the information collected from probing to become too stale. For example, in certain implementations, probing information may be deemed stale whenever the IVS leaves the location and then returns at another time. In such instances, the IVS might retain the information it previously gathered but attempt to update it (overwrite the indicators with new and better information) the next time the IVS is near the corresponding location. Similarly, locations for which there are no networks available for eCalls may be automatically purged and re-probed when the IVS returns to such a location. For IVS that stay in one location for a set period of time, some implementations may provide an expiration for the probing data that triggers the IVS to re-probe again (to ensure a change in network configurations). In other implementations, re-probing may be required after receiving some indicator from the home network that the home network's preferred providers have changed (which, in turn, could render previously accessible roaming networks inaccessible).

Using the indicators obtained from probing and stored by the IVS (in a small local database for example), the process of FIG. 3 can thus be updated to include a look-up for a successfully probed network to immediately identify a suitable network for an eCall.

Figure 5:
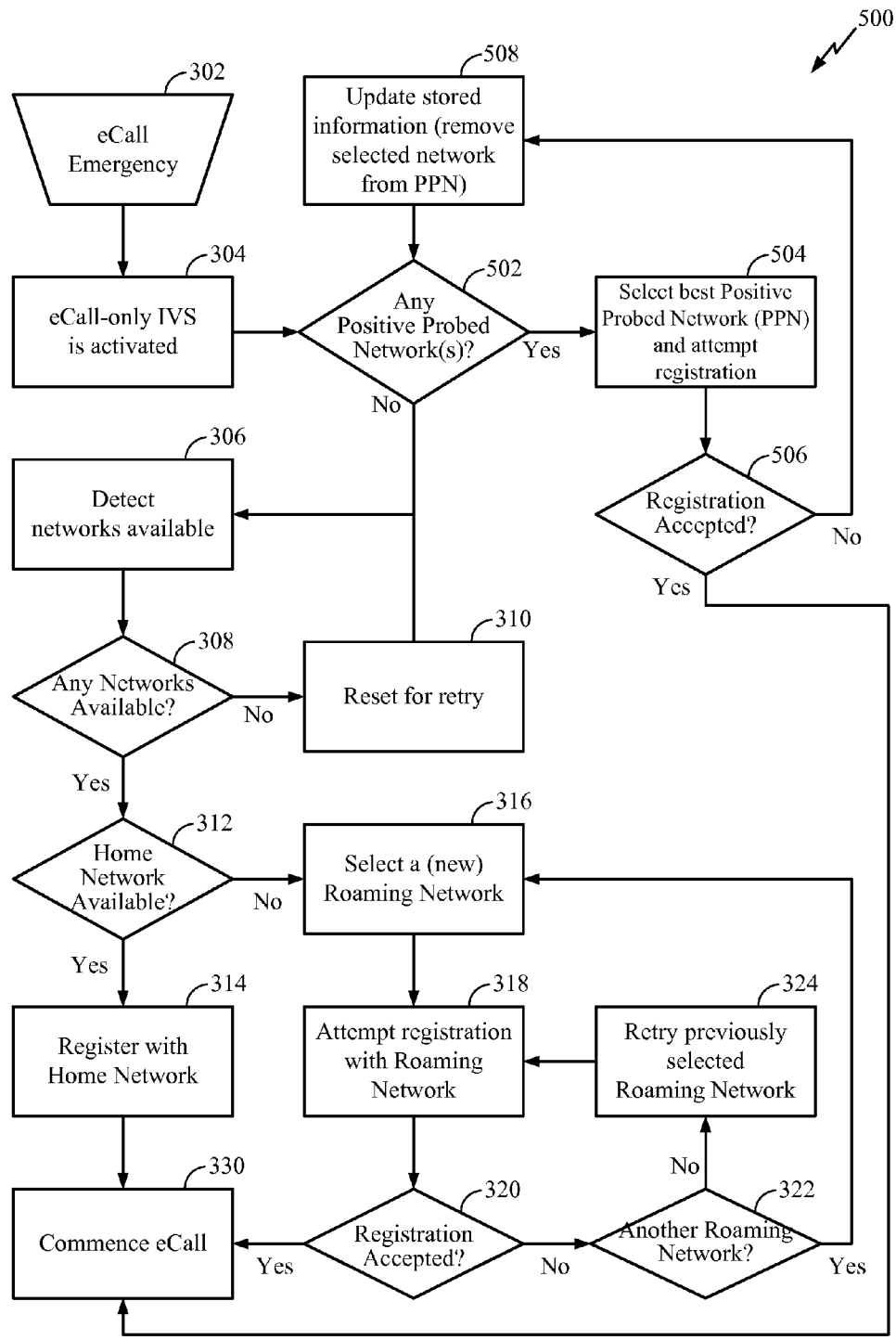
FIG. 5 is an operational flow diagram of a method of an updated eCall-only IVS attempting to register and place an emergency call utilizing probing data in accordance with several implementations disclosed herein.

FIG. 5 is an operational flow diagram of a method 500 of an updated eCall-only IVS attempting to register and place an emergency call utilizing probing data in accordance with several implementations disclosed herein. Similar to FIG. 3, the method 500 of FIG. 5 contains many of the same elements except for the initial check of the stored probing data to select a pre-identified network that is both available and will immediately accept the IVS's registration request and eCall (emergency call). However, after the eCall-only IVS is activated at 304, at 502 the IVS determines—referencing the stored probing indicators—where there are any "positive probed networks" (PPNs) for the IVS's current location (that is, any networks that are both available and have accepted the IVSs registration request during probing). If not, then the process continues at 306 same as before. On the other hand, if there does exist at least one PPN at 502, then at 504 the IVS selects the best PPN to connect to. For several implementations, the best PPN will be (in order) the home network followed by successive roaming networks based on several possible criteria such as, for example, strength of signal (if determined at time of probing and included with the indicator) and/or number of attempts to achieve a successful registration. If, at 506, the IVS successfully connects to the selected best PPN, then the IVS can then commence the eCall at 330. On the other hand, if the IVS cannot connect to the selected PPN at 506, then at 508 the IVS updates the stored indicator information (effectively removing the selected network from being a PPN) and seeks another PPN at 502—and, if no more exist, proceeding again to 306.

Figure 6:
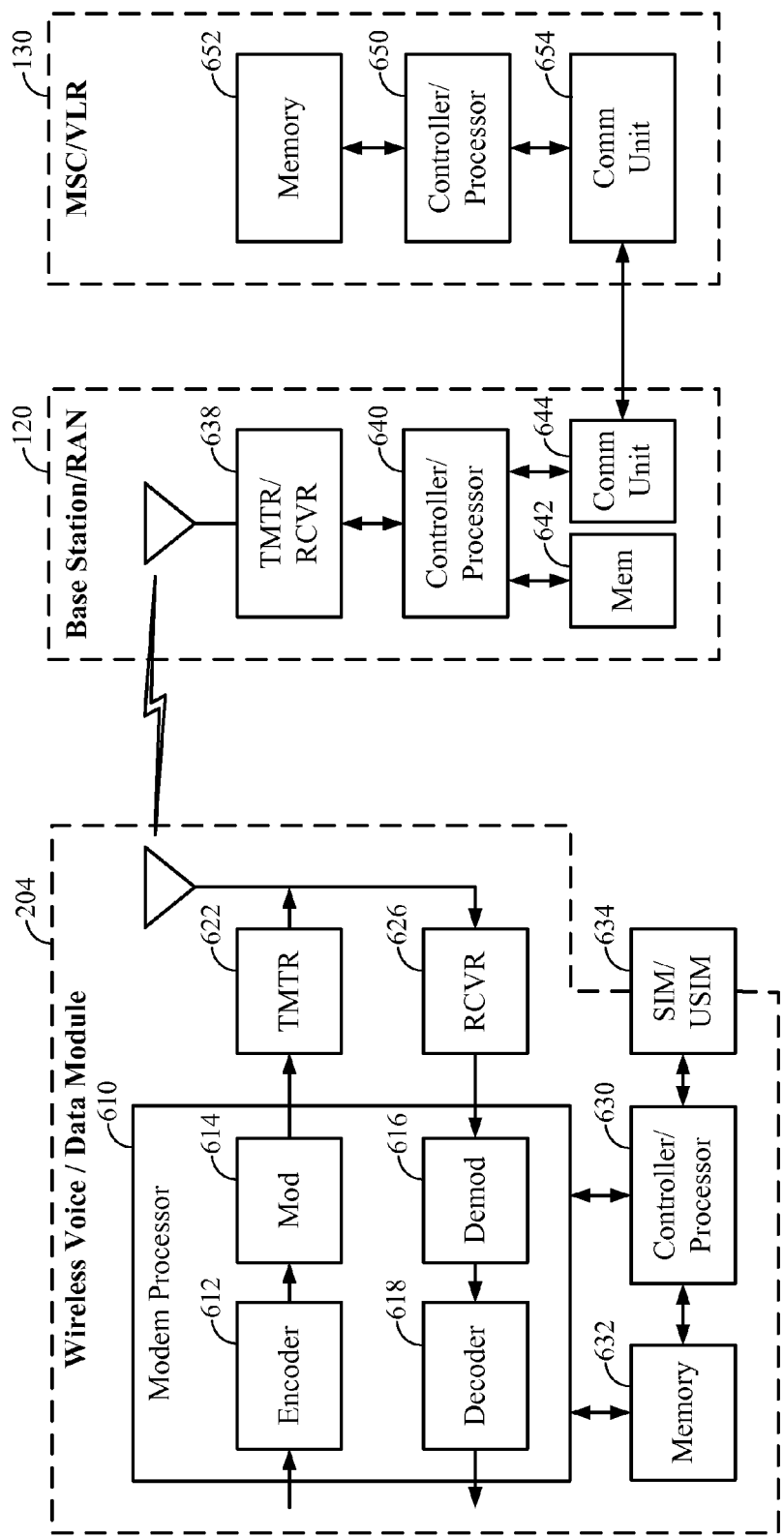
FIG. 6 is a block diagram of an exemplary wireless voice/data module of the IVS of FIG. 2 communicatively coupled to the base station/RAN and MSC/VLR of FIG. 1 during an emergency call (including MMPs related to same).

FIG. 6 is a block diagram of an exemplary wireless voice/data module 204 of the IVS 110 of FIG. 2 communicatively coupled to the RAN 120 and MSC/VLR 130 of FIG. 1 during an emergency call (including MMPs related to same). As illustrated in FIG. 6, when the IVS 110 is active during an emergency, an encoder 612 may receive data and messages to be sent by wireless voice/data module 204. Encoder 612 may process (e.g., encode and interleave) the data and messages and provide coded data and coded signaling. A modulator (Mod) 614 may further process (e.g., modulate, channelize, and scramble) the coded data and signaling and provide output samples. A transmitter (TMTR) 622 may condition (e.g., convert to analog, filter, amplify, and frequency upconvert) the output samples and generate an uplink signal, which may be transmitted to one or more base stations in RAN 120.

Wireless voice/data module 204 may also receive downlink signals transmitted by one or more base stations. A receiver (RCVR) 626 may condition (e.g., filter, amplify, frequency downconvert, and digitize) a received signal and provide input samples. A demodulator (Demod) 616 may process (e.g., descramble, channelize, and demodulate) the input samples and provide symbol estimates. A decoder 618 may process (e.g., deinterleave and decode) the symbol estimates and provide decoded data and messages sent to wireless voice/data module 204. Encoder 612, modulator 614, demodulator 616, and decoder 618 may be implemented by a modem processor 610. These units may perform processing in accordance with the radio technology (e.g., GSM, WCDMA, LTE, etc.) used by the wireless network with which wireless voice/data module 204 is in communication. A controller/processor 630 may direct the operation of various units at wireless voice/data module 204. Memory 632 may store program codes and data for wireless voice/data module 204. A SIM/USIM 634 may store subscription information for a service subscription used for wireless voice/data module 204.

At RAN 120, a transmitter/receiver 638 may support radio communication with IVS 110 wireless voice/data module 204 as well as other terminals (both IVSs and other mobile communication devices). A controller/processor 640 may perform various functions for communication with the terminals. For the uplink, the uplink signal from wireless voice/data module 204 may be received and conditioned by receiver 638 and further processed by controller/processor 640 to recover the data and messages sent by wireless voice/data module 204. For the downlink, data and messages may be processed by controller/processor 640 and conditioned by transmitter 638 to generate a downlink signal, which may be transmitted to wireless voice/data module 204 and other terminals. Memory 642 may store program codes and data for RAN 120. A communication (Comm) unit 644 may support communication with MSC/VLR 130 and other network entities.

At MSC/VLR 130, a controller/processor 650 may perform various functions to support communication services for the terminals. Memory 652 may store program codes and data for MSC/VLR 130. A communication unit 654 may support communication with RAN 120 and other network entities.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Skilled artisans will further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processing unit. Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Position/location determination techniques may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

Moreover, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for probing for available roaming networks on which an eCall can be successfully placed, the method comprising:
   identifying an available roaming network;
   attempting to register with the roaming network; and
   storing, at a mobile eCall-only device, results of the attempting in a storage for future reference.

2. The method of claim 1, wherein the eCall-only device is an in-vehicle system (IVS).

3. The method of claim 1, wherein a frequency of the probing is increased or decreased based on at least one factor from among a plurality of factors comprising: whether service is available from a home network, whether service is available from a roaming network, whether there is no service, whether the probing is conducting while moving, and whether probing has previously been completed for a specific location.

4. The method of claim 1, further comprising detecting a plurality of available roaming networks, and wherein the identifying, attempting, and storing are performed for each roaming network from among the plurality of available roaming networks so detected.

5. The method of claim 1, wherein the storing the results comprises storing an identification for the roaming network, an indicator of whether the probing was successful, and a timestamp for the probing.

6. The method of claim 5, wherein the storing further comprises storing at least one data point from among a group of potential data points comprising: a location from which the probing was attempted, and a signal strength corresponding to the roaming network so probed.

7. The method of claim 1, wherein the results in the storage expire.

8. The method of claim 1, further comprising retrieving the results to identify an available network on which to successfully register and make an eCall.

9. The method of claim 8, further comprising making an eCall.

10. The method of claim 1, further comprising providing a notification based on being unable to successfully register with at least one roaming network.

11. The method of claim 1, further comprising detaching from the roaming network based on being successfully registered by the roaming network.

12. An apparatus for probing for available roaming networks on which an eCall can be successfully placed, the apparatus comprising:
    means for identifying an available roaming network;
    means for attempting to register with the roaming network; and
    means for storing, at a mobile eCall-only device, results of the attempting in a storage for future reference.

13. The apparatus of claim 12, wherein the apparatus is an in-vehicle system (IVS).

14. The apparatus of claim 12, further comprising means for increasing or decreasing a frequency of the probing based on at least one factor from among a plurality of factors comprising: whether service is available from a home network, whether service is available from a roaming network, whether there is no service, whether the probing is conducting while moving, and whether probing has previously been completed for a specific location.

15. The apparatus of claim 12, further comprising means for detecting a plurality of available roaming networks, and wherein the identifying, attempting, and storing are performed for each roaming network from among the plurality of available roaming networks so detected.

16. The apparatus of claim 12, wherein the means for storing comprises means for storage an identification for the roaming network, an indicator of whether the probing was successful, and a timestamp for the probing.

17. The apparatus of claim 16, wherein the means for storing further comprises means for storing at least one data point from among a group of potential data points comprising: a location from which the probing was attempted, and a signal strength corresponding to the roaming network so probed.

18. The apparatus of claim 12, further comprising means by which the results in the storage are expired.

19. The apparatus of claim 12, further comprising means for retrieving the results to identify an available network on which to successfully register and make an eCall.

20. The apparatus of claim 19, further comprising means for making an eCall.

21. The apparatus of claim 12, further comprising means for providing a notification based on being unable to successfully register with at least one roaming network.

22. The apparatus of claim 12, further comprising means for detaching from the roaming network based on being successfully registered by the roaming network.

23. A non-transitory computer-readable medium for probing for available roaming networks on which an eCall can be successfully placed, the non-transitory computer-readable medium comprising instructions that cause a mobile eCall-only device to:
    identify an available roaming network;
    attempt to register with the roaming network; and
    store, at the mobile eCall-only device, results of the attempt in a storage for future reference.

24. The computer-readable medium of claim 23, wherein the instructions are executed by an in-vehicle system (IVS).

25. The computer-readable medium of claim 23, further comprising instructions that cause the computer to increase or decrease a frequency of the probing based on at least one factor from among a plurality of factors comprising: whether service is available from a home network, whether service is available from a roaming network, whether there is no service, whether the probing is conducting while moving, and whether probing has previously been completed for a specific location.

26. The computer-readable medium of claim 23, further comprising instructions that cause the computer to:
   detect a plurality of available roaming networks; and
   perform the identify, attempt, and store instructions for each roaming network from among the plurality of available roaming networks so detected.

27. The computer-readable medium of claim 23, wherein the instructions that cause the computer to store further comprise instructions to cause the computer to store an identification for the roaming network, an indicator of whether the probing was successful, and a timestamp for the probing.

28. The computer-readable medium of claim 27, wherein the instructions that cause the computer to store further comprise instructions to cause the computer to store at least one data point from among a group of potential data points comprising: a location from which the probing was attempted, and a signal strength corresponding to the roaming network so probed.

29. The computer-readable medium of claim 23, further comprising instructions that cause the computer to expire the results in the storage.

30. The computer-readable medium of claim 23, further comprising instructions that cause the computer to retrieve the results in order to identify an available network on which to successfully register and make an eCall.

31. The computer-readable medium of claim 30, further comprising instructions that cause the computer to make an eCall.

32. The computer-readable medium of claim 23, further comprising instructions that cause the computer to provide a notification based on being unable to successfully register with at least one roaming network.

33. The computer-readable medium of claim 23, further comprising instructions that cause the computer to detach from the roaming network based on being successfully registered by the roaming network.

34. A system for probing for available roaming networks on which an eCall can be successfully placed, the system comprising:
   at least one processor configured to identify an available roaming network and attempt to register with the roaming network; and
   a storage for storing, at a mobile eCall-only device, results of the attempt.

35. The system of claim 34, wherein the at least one processor operates in an in-vehicle system (IVS).

36. The system of claim 34, wherein the at least one processor is further configured to increase or decrease a frequency of the probing based on at least one factor from among a plurality of factors comprising: whether service is available from a home network, whether service is available from a roaming network, whether there is no service, whether the probing is conducting while moving, and whether probing has previously been completed for a specific location.

37. The system of claim 34, wherein the at least one processor is further configured to detect a plurality of available roaming networks, and wherein the identifying, attempting, and storing are performed for each roaming network from among the plurality of available roaming networks so detected.

38. The system of claim 34, wherein the at least one processor is further configured to store in the storage an identification for the roaming network, an indicator of whether the probing was successful, and a timestamp for the probing.

39. The system of claim 38, wherein the at least one processor is further configured to store in the storage at least one data point from among a group of potential data points comprising: a location from which the probing was attempted, and a signal strength corresponding to the roaming network so probed.

40. The system of claim 34, wherein the at least one processor is further configured to expire results in the storage.

41. The system of claim 34, wherein the at least one processor is further configured to retrieve the results from the storage in order to identify an available network on which to successfully register and make an eCall.

42. The system of claim 41, wherein the at least one processor is further configured to initiate an eCall.

43. The system of claim 34, wherein the at least one processor is further configured to provide a notification based on being unable to successfully register with at least one roaming network.

44. The system of claim 34, wherein the at least one processor is further configured to detach from the roaming network based on being successfully registered by the roaming network.

* * * * *